United States Patent [19]

Shadzi

[11] Patent Number: 4,588,611
[45] Date of Patent: May 13, 1986

[54] DISK STRIPPING AND COATING PROCESS

[75] Inventor: Bahram Shadzi, Richfield, Minn.

[73] Assignee: Magnetic Peripherals Inc., Minneapolis, Minn.

[21] Appl. No.: 677,936

[22] Filed: Dec. 4, 1984

Related U.S. Application Data

[63] Continuation of Ser. No. 585,791, Mar. 2, 1984, abandoned, which is a continuation-in-part of Ser. No. 504,638, Jun. 15, 1983, abandoned.

[51] Int. Cl.$^4$ .............................................. H01F 10/02
[52] U.S. Cl. .................................. 427/129; 427/128; 427/130; 427/140
[58] Field of Search ................ 427/140, 130, 128, 129

[56] References Cited

U.S. PATENT DOCUMENTS 4,353,937 10/1982 Chiba et al. ......................... 427/130

Primary Examiner—Bernard D. Pianalto
Attorney, Agent, or Firm—J. A. Genovese; E. L. Schwarz

[57] ABSTRACT

The invention comprises a process for stripping disks coated by the process disclosed in the parent application described above. According to that process, the disks are rotated at high speed during a media application step, then immersed in an orienting magnetic field, and finally dried at low speed. If a flaw is detected after drying, according to the stripping and recoating process of the present invention, the disk is simply stripped and recoated by merely repeating the high speed coating step. During stripping and recoating, the nozzle starts at the outside diameter and moves toward the inside diameter. As the nozzle moves from outside diameter to inside diameter, the new media which is discharged from the nozzle onto the disk strips away the old media layer. Once the nozzle reaches the inside diameter, it moves back toward the outside diameter and applies a new layer of media to the disk.

10 Claims, 5 Drawing Figures

DISK STRIPPING AND COATING PROCESS

This is a continuation of Ser. No. 06/585,791 filed on Mar. 2, 1984, which is a continuation-in-part of my prior application Ser. No. 504,638 filed June 15, 1983, now both abandoned.

BACKGROUND

The invention relates to processes for stripping magnetic media off of a disk.

In the past, disk stripping was typically done using mechanically driven brushes and solvents. In some cases, a light grinding operation has been necessary. Shortcomings of this process include: excessive and time consuming handling of the disks; the additional costs of materials, labor and process equipment; and contamination of the disk from the stripping solvents.

Alternatively, the disk can be stripped using a solvent spray wash while the disk is still on the coating machine. According to this method, while the disk is rotated at relatively high speed (approximately 2,000 rpm), a short spray of acetone is directed at the inside diameter of the disk, with the operator then immediately wiping the entire surface of the disk with a lint free cloth, saturated with acetone. Some shortcomings of this process are that: when the acetone spray is directed at the inside diameter of the disk, some of the acetone invariably leaks under the hub cover and flows to the other side of the disk causing a partial stripping of the coating on the opposite side of the disk; acetone contamination of the disk often results; small water droplets can form on the surface of the disk due to condensation resulting from excessive cooling of the disk during acetone evaporation, with these water droplets causing coating runs and streaks; and the wiping operation can itself scratch the disk surface.

SUMMARY

The invention comprises a method for stripping magnetic media from a disk wherein after a defect has been detected in a disk, and before the disk is cured (i.e., baked), the disks are rotated at high speed and new media is discharged from the nozzle onto the disk as the nozzel moves from the outside diameter of the disk to the inside diameter. The discharge pressure of the media stream is great enough, and disk rotational speed is fast enough, so that the new media stream strips away the old media. Then as the nozzle moves back from the inside diameter towards to the outside diameter a new media layer is applied to the disk.

DESCRIPTION OF THE PRESENTLY PREFERRED EMBODIMENT OF THE INVENTION

Figure 1:
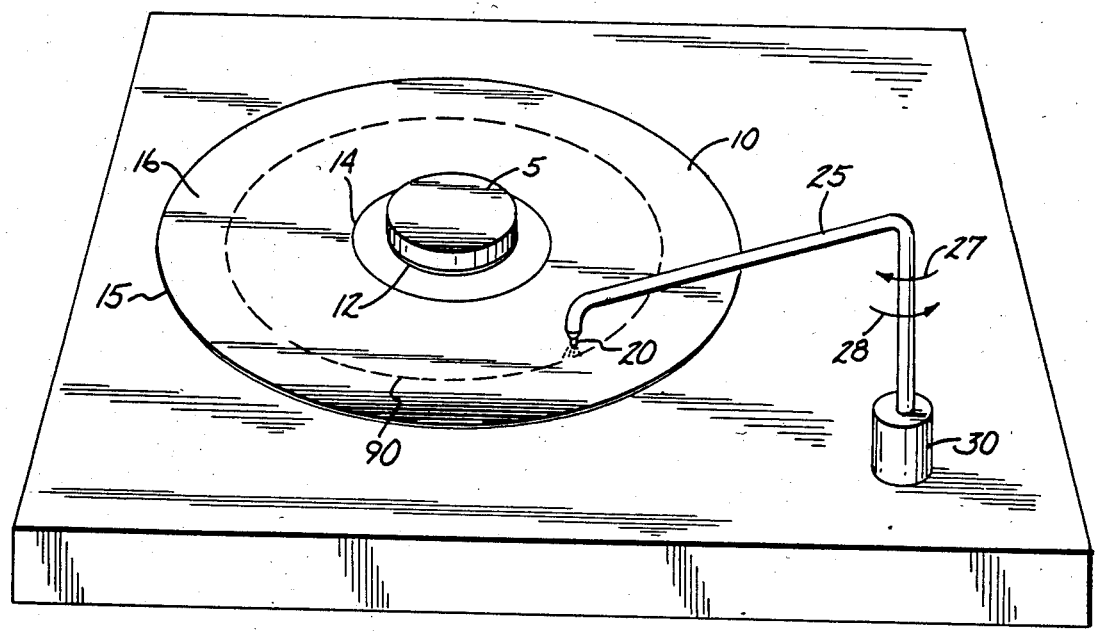
FIG. 1 shows a perspective view of an apparatus on which the present process can be applied.

FIG. 1 shows a simplified disk coating apparatus on which the stripping process of the present invention can be performed. Only the very basic structure of the apparatus 1 is important to the invention, and therefore, the details of the apparatus 1 are not shown. Apparatus 1 has a rotating spindle 5 which has a variable rotational speed of up to at least 3800 rpm, for example. The spindle 5 is rotated by a power source (not shown). A disk 10 upon which magnetic media is to be applied has a central aperture 12 which is secured for rotation to spindle 5 by any suitable mechanism. Disk 10 has an inside diameter 14 and an outside diameter 15 which defines the concentric region 16 of disk 10 upon which the magnetic media will be applied. A magnetic media dispensing nozzle 20 is supported by an arm 25 which is, in turn, pivoted by a motor 30 under the control of a control system (not shown). Arm 25 includes a fluid conduit (not shown) which connects nozzle 20 to the pressurized source of fluid magnetic media (not shown). In the preferred embodiment, the discharge opening at the tip of nozzle 20 is approximately 0.02 inches. Arm 25 is pivotable by motor 30 in the direction of arrows 27, 28 so that nozzle 20 can travel from outside diameter 15 to inside diameter 14 and back again. The control system of motor 30 determines the rate of travel of nozzle 20 across disk 10. A mechanism may be provided to vary the discharge pressure of nozzle 20.

Figure 2:
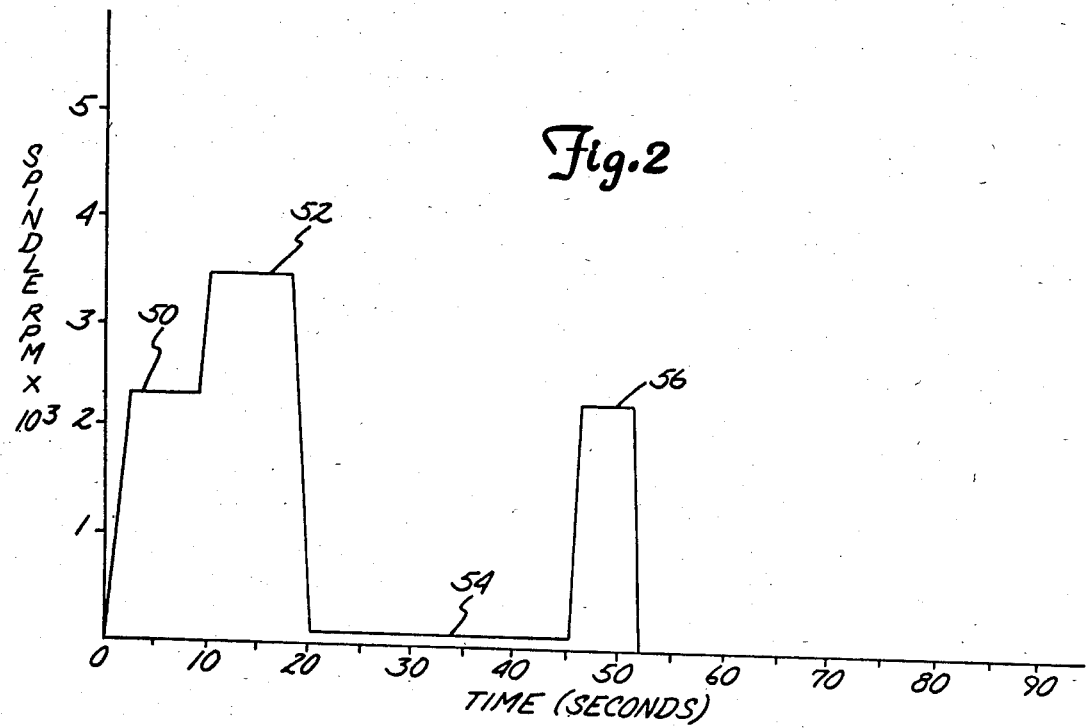
FIG. 2 shows a spindle speed versus time graph to illustrate the steps of the process.
Figure 3:
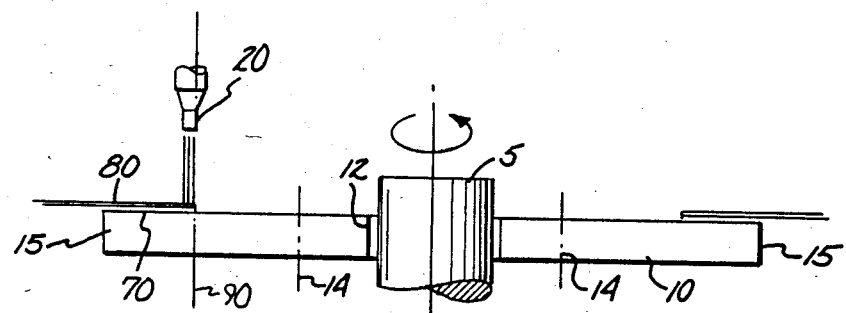
FIG. 3 shows an elevational view of the disk as the nozzle is moving from outside diameter to inside diameter during the original coating process.
Figure 4:
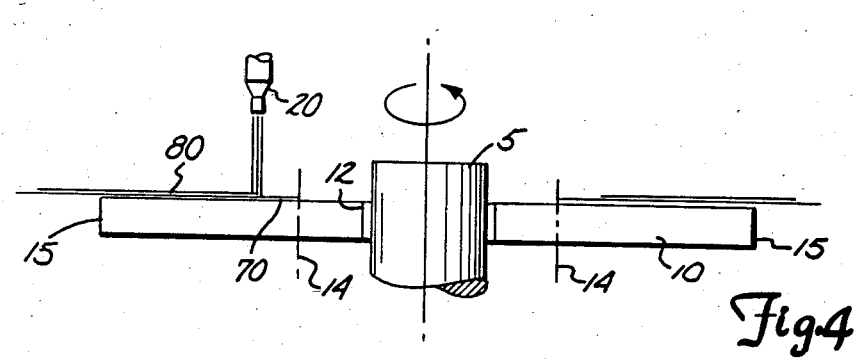
FIG. 4 shows the nozzle returning from the inside diameter and moving towards the outside diameter and applying a new layer of media in accordance with the original coating process.

Having disclosed the basic structure of the apparatus 1, reference is now made to FIG. 2 wherein the process for coating the disk is illustrated by means of a graph showing disk rotational speed versus time. This process was previously disclosed in parent application Ser. No. 504,638, filing date June 15, 1983, entitled "High Speed Coating Process for Magnetic Disks", by Bahram Shadzi and Charles P. Ericson. The process begins with a solvent washing step 50 during which the disk is rotated at 2300 rpm (approximately) for 10 seconds (approximately) while it is lightly wiped with a lint free cloth saturated with a cleaning solvent to free the surface of any airborne fines and particulates. Hopefully, this step can be eliminated in the future through better disk handling procedures prior to the disk 10 being placed on spindle 5. Immediately following the solvent washing step 50, the speed of the disk is increased in step 52 to at least 2500 rpm (approximately) for 8–9 seconds (approximately) while nozzle 20 dispenses magnetic media at a nozzle discharge pressure of 6–8 psig (approximately) starting at outside diameter 15 and moving to inside diameter 14, pausing at inside diameter 14 for approximately one second, and then returning to outside diameter 15 at a rate of travel of approximately 1.2 inches per second. FIGS. 3 and 4 illustrate the application of the fluid magnetic media to disk 10 during step 52. The fluid magnetic media comprises iron oxide particles suspended in a polymeric binder composition. As shown in FIG. 3, as the nozzle 20 moves from outside diameter 15 toward inside diameter 14, an extremely thin film of media 70 adheres to the surface of the disk while an excess (non-adhering) media layer 80 flows from the nozzle point of travel 90 radially outward toward the outside diameter 15 and then off of disk 10 due to the centrifugal force generated by the high rotational speed of disk 10. The high speed rotation of disk 10 ensures that only a very thin film of media 70 adheres to the disk and in addition ensures that the protective layer 80 extends over the entire concentrically shaped disk surface disposed radially outward from the point of travel 90 of nozzle 20. The excess media layer 80 acts as a protective layer while the nozzle 20 moves from outside diameter 15 to inside diameter 14 preventing the underlying film 70 from evaporating and undergoing rapid viscosity changes. Once nozzle 20 reaches inside diameter 14, it pauses momentarily (approximately one second) to ensure that the edge of media film 70 is well defined at inside diameter 14. Nozzle 20 then moves radially outward back toward outside diameter 15. As shown in FIG. 4, as nozzle 20 moves back toward outside diameter 15, protective layer 80 also advances back toward outside diameter 15 exposing the thin media film 70 to the atmosphere. The rate of travel of nozzle 20 is approximately 1.2 inches per second. Once nozzle 20 has reached outside diameter 15, the disk is immediately moved into orientation step 54 of FIG. 3 wherein the speed of disk 10 is reduced to approximately 52 rpm for 10-15 seconds while the disk 10 is exposed to a magnetic orienting field. Note that the disk is exposed to the magnetic orienting field only seconds after the first portions of thin film 70 are exposed to the atmosphere. Consequently, only minimal evaporation and changes in viscosity take place from the time the media is first applied to disk 10 and exposed to the atmosphere to the start of the orientation step. As a result, the magnetic particles of the thin film 70 are much more susceptible to complete orientation along the lines of the magnetic orientation field than was possible with the prior process, resulting in a higher quality disk.

A very short drying step 56 follows orientation step 54 with the disk being rotated for no more than five seconds at 2300 rpm (approximately) in the absence of the magnetic orienting field to accelerate drying. The media film 70 produced by the instant process is much thinner (10-20 microinches) than was possible with the prior process (30 microinches, at minimum). Consequently, the film 70 dries much faster than was previously the case and drying step 56 is considerably shortened and may even be eliminated.

Having described the coating process described in the co-pending parent application, the stripping process of the present invention will now be described.

Figure 5:
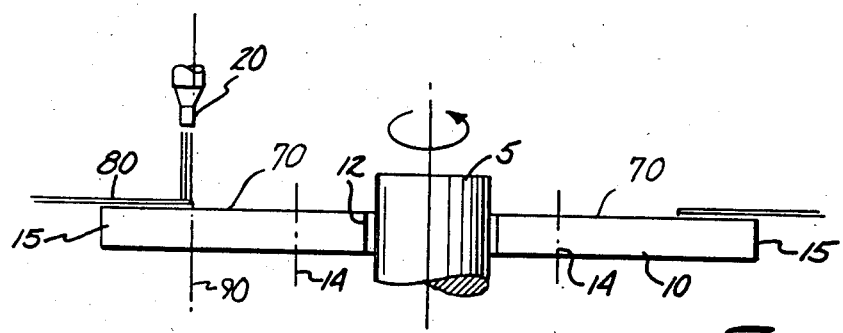
FIG. 5 shows the stripping process of the present invention, with the nozzle moving from the outside diameter to the inside diameter to strip the original media layer 70 from the disk.

FIG. 5 shows the disk 10 with the media layer 70 adhering to the disk. If after coating the disk with the media layer 70, the operator detects a coating flaw, the disk can be stripped and recoated according to the stripping process of the present invention. According to the stripping process, the disk is again rotated at high speed (at least 2500 rpm) while pressurized fluid magnetic media is applied to disk 10 through dispensing nozzle 20. The discharge pressure of the media is, again, 6-8 psig (approximate). The dispensing of the fluid media begins beyond the outside diameter 15 of the disk 10 and continues toward the inside diameter 14 and ultimately ceases beyond the outside diameter 15 of disk 10. In this process, the inward traverse of the nozzle 20 constitutes the stripping process, and conversely, the outward traverse of this nozzle applies the new media layer. Step 52 described with respect to FIG. 2 is merely repeated. As the dispersing nozzle 20 moves toward the disk inside diameter, a continuous stream of pressurized fluid media grinds and washes away the old coating 70B and exposes aluminum substrate below it to a freshly applied media. As the dispensing nozzle moves toward the outside diameter, the excess media 80 continues to be spun off the disk, and the new coating layer advances toward the disk outside diameter exactly as is shown in FIG. 4. The disk then again undergoes the orientation step 54 and drying step 56 as described with reference to FIG. 2.

Consequently, defective disks are simply recoated without the introduction of any solvents or any form of mechanical wiping. Moreover, the elimination of the prior stripping processes results in much shorter process times. An interesting feature of the process is that it may be repeated as many times as required until a visually acceptable disk is finally produced.

Having described the presently preferred embodiment of the invention, many modifications and variations thereof will be obvious to those skilled in the art, and accordingly the invention is intended to be limited only by the scope of the appended claims.

I claim:

1. A method of stripping a defective magnetic media layer comprising iron oxide particles suspended in a dried, uncured polymeric binder composition from a disk to prepare said disk for recoating, said disk having an outside diameter and an inside diameter, comprising the steps of:

rotating the disk at a rotational speed of at least 2500 rpm, and dispensing a liquid stream of magnetic medium material comprising iron oxide particles suspended in a liquid polymeric binder and a solvent, from a nozzle upon said media layer of said disk, starting at said outside diameter of said disk and moving to said inside diameter of said disk, whereby said media layer is stripped from said disk as said media stream nozzle moves from said outside diameter to said inside diameter.

2. The method of claim 1 wherein after said media stream nozzle travels from said outside diameter to said inside diameter to strip said media layer, said media stream nozzle moves from said inside diameter back to said outside diameter to apply a new media layer to said disk.

3. The method of claim 1 wherein following said stripping step and the application of the new media layer as said nozzle moves from said inside diameter to said outside diameter, the rotational speed of said disk is reduced and said disk is exposed to a magnetically orienting field during an orientation step.

4. The method of claim 3 further comprising a drying step immediately following said orientation step, the rotational speed of said disk being increased during said drying step to accelerate the drying of said film.

5. The method of claim 1 wherein said discharge pressure of said media stream dispensed from said nozzle is at least 5 psig.

6. The method of claim 1 wherein said nozzle has a rate of travel while moving from said outside diameter to said inside diameter and wherein said rate of travel of said nozzle is between 1.0 inches per second and 1.5 inches per second during said layer stripping step.

7. A method for preparing a disk memory substrate for coating by a magnetic medium comprising
 (a) coating a disk substrate with a magnetic medium material comprising iron oxide particles suspended in a polymeric binder composition to form a dried, uncured layer of medium on the disk;
 (b) inspecting said uncured layer for visual acceptability; and if unacceptable
 (c) rotating the disk at a rotational speed at least 2500 rpm, and dispensing a stream of magnetic medium material comprising iron oxide particles suspended in a liquid polymeric binder and a solvent, from a nozzle upon said medium layer of said disk, starting at said outside diameter of said disk and moving to said inside diameter of said disk, wherein said original medium layer is stripped from said disk as said medium stream nozzle moves from said outside diameter to said inside diameter.

8. The method of claim 7 wherein after said medium stream nozzle travels from said outside diameter to said inside diameter to strip said medium layer, said medium stream nozzle moves from said inside diameter back to said outside diameter to apply a new medium layer to said disk.

9. The method of claim 7 wherein said discharge pressure of said medium stream dispensed from said nozzle is at least 5 psig.

10. The method of claim 7 wherein said nozzle has a rate of travel while moving from said outside diameter to said inside diameter and wherein said rate of travel of said nozzle is between 1.0 inches per second and 1.5 inches per second during said coating stripping step.

* * * * *